United States Patent [19]

Gnage et al.

[11] 3,827,588

[45] Aug. 6, 1974

[54] FILM CARTRIDGE OPENER

[75] Inventors: Oliver W. Gnage; John J. Enfonde, both of Rochester, N.Y.

[73] Assignee: Eastman Kodak Company, Rochester, N.Y.

[22] Filed: Mar. 16, 1973

[21] Appl. No.: 342,007

[52] U.S. Cl. .................................. 214/305, 225/93
[51] Int. Cl. .................................. B65g 65/04
[58] Field of Search ........... 214/304, 305; 29/200 B, 29/200 D, 208 D; 225/93, 96.5, 97, 103; 95/31, 90.5, 352

[56] References Cited
UNITED STATES PATENTS

| | | | |
|---|---|---|---|
| 3,384,252 | 5/1968 | West | 214/305 |
| 3,494,519 | 2/1970 | Koehler | 225/93 |
| 3,580,443 | 5/1971 | Hennig et al. | 225/96.5 |

*Primary Examiner*—Robert J. Spar
*Assistant Examiner*—Lawrence J. Oresky
*Attorney, Agent, or Firm*—L. P. Kessler

[57] ABSTRACT

Apparatus for opening frangible film cartridges and capturing the spool of exposed film housed therein so that the film can be readily removed from the spool. A frangible film cartridge is removed from a cartridge hopper and driven past a knife edge to slit the cartridge housing adjacent the film spool as the cartridge is being positioned such that the film spool contained therein is captured on a support post. The post is then actuated to pull the film spool from the slit cartridge and present the spool to a manual film stripping station while the cartridge housing is discarded. After the film is stripped from the spool, the support post is returned to its initial position for receiving a new film spool, the empty spool being automatically discarded.

8 Claims, 7 Drawing Figures

PATENTED AUG 6 1974 3,827,588

FILM CARTRIDGE OPENER

CROSS REFERENCE TO RELATED APPLICATIONS

Reference is hereby made to commonly assigned co-pending United States Patent Application No. 336,292, entitled "FILMSTRIP HANDLING DEVICE," filed in the name of Oliver W. Gnage on Feb. 27, 1973; and U.S. Pat. application No. 336,291, entitled "PRE-PROCESS FILM SPLICING SYSTEM," filed in the name of Robert E. Cole on Feb. 27, 1973.

BACKGROUND OF THE INVENTION

1. Field of the Invention

This invention relates to an apparatus for opening film cartridges and more particularly to an apparatus for opening frangible film cartridges and capturing the spool of film housed therein.

2. Description of the Prior Art

Amateur photography as it is known today has been greatly influenced by the instant loading camera. The reality of an instant loading camera was made possible by the invention of the frangible film cartridge shown and described in U.S. Pat. No. 3,260,182 in the name of Nerwin and assigned to Eastman Kodak Co. In this invention a molded plastic magazine body having a film supply chamber, a film spool chamber, and an interconnecting cover are joined to encapsulate a plastic spool. A strip of light protective paper is attached to the spool by an adhesive tape and the film itself is taped to the light protective paper. The film and paper are wound on themselves to be housed in a supply chamber with the light protective backing paper extending through the interconnecting cover across a magazine exposure opening between the cartridge chambers, to its attachment point with the plastic spool. Such a loaded film cartridge structure may be simply dropped into a camera without necessitating the handling of the film itself. As the film is advanced during the picture taking process, it is drawn into the spool chamber to be wound on the spool. After the full filmstrip has been exposed, the cartridge is removed from the camera. In order to retrieve the film from the cartridge for processing, the cartridge must be broken open to remove the film spool therefrom so that the film may be stripped off of the spool.

The breaking open of the film cartridge must be carefully accomplished to prevent splintering of the plastic housing and subsequent damage to the film by the splintered housing fragments. Several mechanisms for opening frangible film cartridges are shown in U.S. Pat. Nos. 3,411,682 in the name of Leader et al., and 3,580,443 in the name of Hennig et al. In the opener shown by Leader et al., the film cartridge is manually placed in the opener housing to be supported on the film spool axis and is then rotated rapidly about the axis until a shelf on the cartridge body adjacent the spool contacts a stationary knife to rupture the cartridge. The spool remains captured in the opener at the axis support position where an operator can manually remove the film from the spool. While the location of the shelf is selected to reduce the amount of splintering by the frangible cartridge, the breaking action is still a severe one which may produce some damaging housing fragments. Additionally, the manual placement of the cartridge in the opener and the fact that it remains therein while the film is being removed, limits the speed with which the film retrieval operation can be accomplished and gives rise to difficulties generally associated with manual work which must be accomplished in the dark. In the Hennig et al opener, a chisel is moved toward a supported film cartridge body to penetrate a seam thereof. Once the chisel has penetrated the body, it is rotated about a central axis of the cartridge to cause the crack made therein to propagate to the extent necessary to remove the film spool. The operator then removes the fractured cartridge from the opener and manually extracts the film spool therefrom. While this arrangement lessens the possibility of the existance of damaging housing fragments, it does nothing to reduce the difficulties associated with manual film handling, which must be accomplished in the dark, or to increase the speed of operation of prior cartridge opener mechanisms.

SUMMARY OF THE INVENTION

In view of the above, it is the object of this invention to provide a novel opener for frangible film cartridges, the opened cartridges being free from potentially damaging housing fragments.

It is also an object of this invention to provide a frangible film cartridge opener which materially reduces manual operational steps in retrieving exposed filmstrips and is therefor capable of high speed operation.

Another object of this invention is to provide a frangible film cartridge opener which automatically captures the film spool separating it from an opened film cartridge and presents it to a manual film stripping station while the opened cartridge is automatically discarded.

It is an additional object of this invention to provide a frangible film cartridge opener having an automatic feed mechanism for delivering film cartridges to the opener to insure that the cartridges will be opened in a specific order.

Therefore there is herein provided an apparatus having a hopper into which exposed film cartridges are placed in a specific order. The film cartridges which are formed of a frangible material are gravity fed, in order, from a hopper to a chamber where they are then in turn driven past a knife edge to slit the cartridge housing as the cartridge is positioned such that the film spool contained therein is captured by a film spool support post. The post is then actuated to pull the film spool from the slit cartridge and present the spool to a manual film stripping station, while the cartridge housing is discarded. After the film is stripped from the spool, the spool support post is returned to its initial position for receiving a new film spool, the empty spool being automatically discarded.

DESCRIPTION OF THE PREFERRED EMBODIMENT

Figure 1:
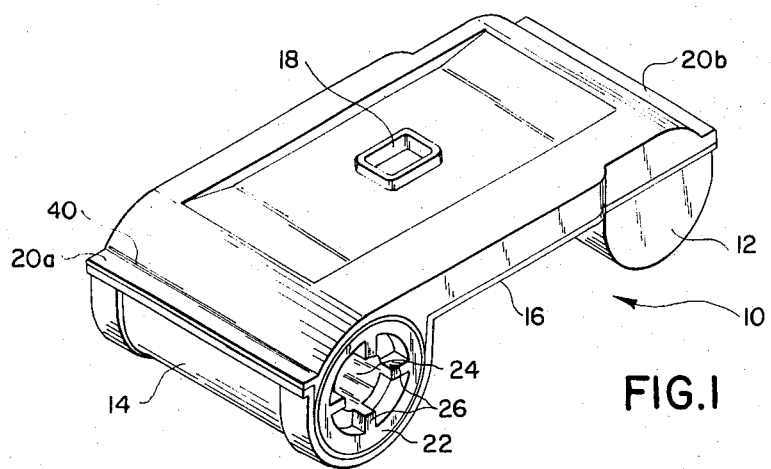
FIG. 1 is a perspective view of a typical frangible film cartridge of the type to be opened by the cartridge opener according to this invention.
Figure 3:
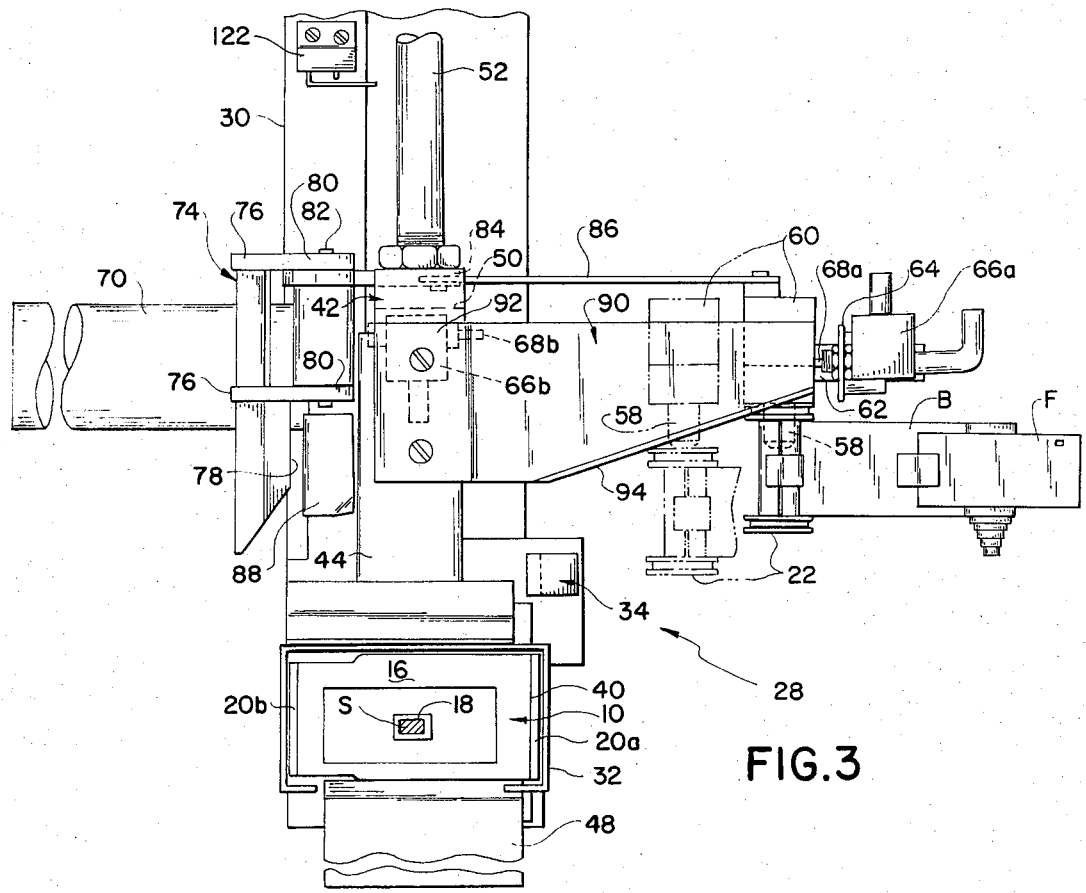
FIG. 3 is a top plan view of a portion of FIG. 2 showing the operative position in which a film cartridge about to be removed from a cartridge hopper and the film spool support post is positioned at its film stripping location (solid lines) and in an intermediate position where an empty film spool is being discarded (phantom lines)

Referring now to the drawings, FIG. 1 shows a typical frangible film cartridge 10 which is used in amateur instant loading cameras. The cartridge 10 has a supply chamber 12 and a take-up chamber 14 joined by an interconnecting cover member 16 which guides the film from the supply chamber 12 to the take-up chamber 14 through a film plane formed by the cover member 16 as described in the aforementioned U.S. Pat. No. 3,260,182. The cover member 16 has an identification window 18 which enables viewing of numbers on the backing paper indicating film frames. Flanges 20a and 20b extend from the ends of the cover member 16 to mate with corresponding flanges on the supply chamber 12 and take-up chamber 14 so as to form a light-tight magazine to prevent unwanted exposure of the film contained therein. Within the take-up chamber 14 there is located a film spool 22. The film spool has a central bore 24 and a series of splines 26 formed at the end thereof to permit the spool 22 to be driven by a camera film advance mechanism. As previously described, a piece of backing paper B is taped to the spool 22 (note the film and backing paper relationship as shown in FIG. 3) with the film F being in turn taped to the backing paper B. As the film is advanced during picture taking, the film F and backing paper B are withdrawn from the chamber 12 until the entire filmstrip is on the spool 22 in the take-up chamber 14.

Figure 2:
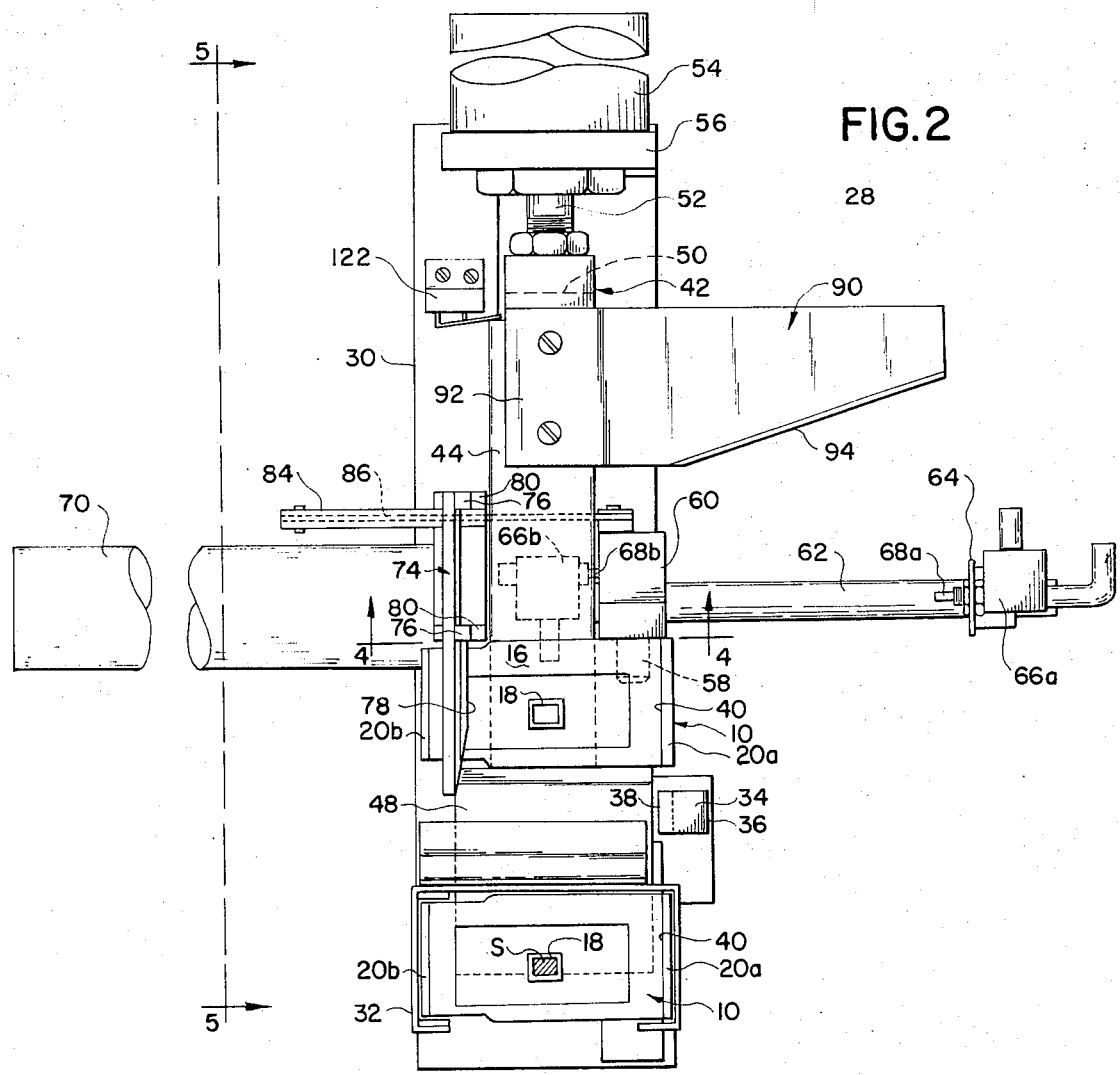
FIG. 2 is a top plan view of the novel film cartridge opener according to this invention showing the operative position in which a film cartridge is located on a film spool support post.
Figure 4:
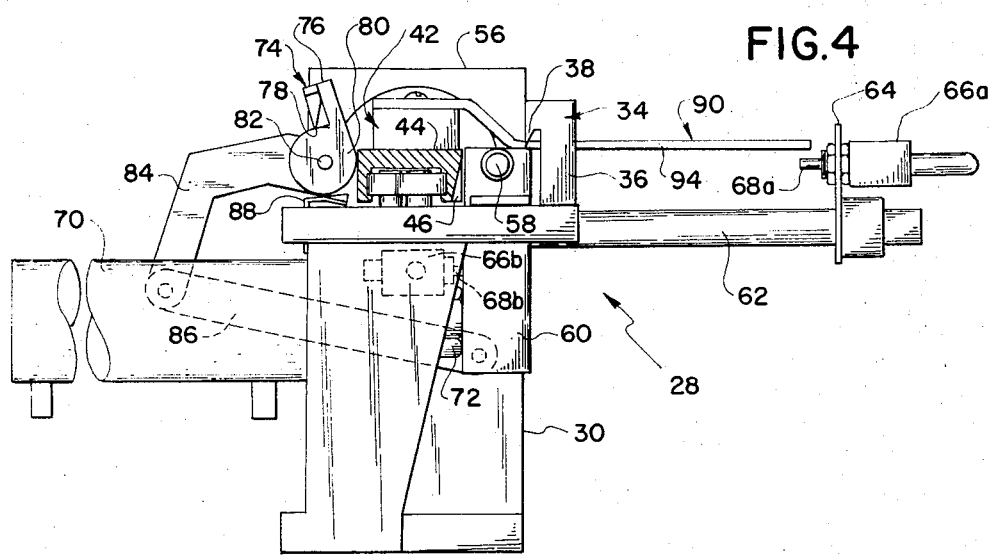
FIG. 4 is a front elevational view taken along the lines 4—4 of FIG. 2 with the film cartridge removed to show the film support post and a kicker assembly actuating linkage.
Figure 5:
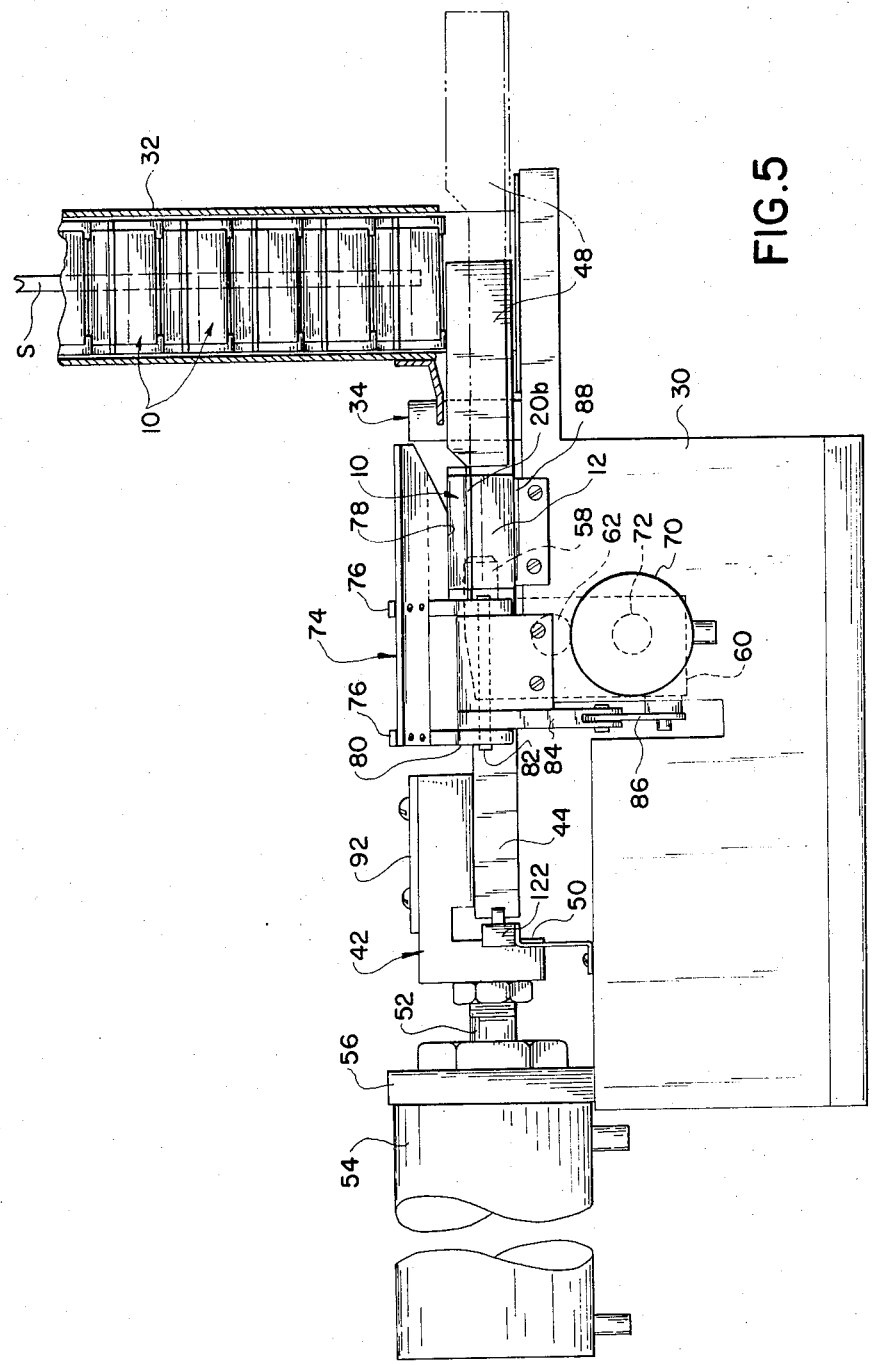
FIG. 5 is a side elevational view taken along the lines 5—5 of FIG. 2 showing a carriage assembly in its film spool captured position (solid lines) and in a position to receive a film cartridge from the film cartridge hopper (phantom lines)

In order to open the frangible cartridge 10 to remove the film spool 22 therefrom, there is herein provided a film cartridge opener 28, the construction of which is best seen in FIGS. 2, 4 and 5. The opener 28 has a frame 30 upon which is mounted a hopper 32 in which frangible film cartridges 10 are placed in a specific order by, for example, stacking on a stick S which extends through the identification window 18. The hopper 32 is sized so that the cartridges will be particularly positioned therein to permit them to be fed singularly in proper orientation to the opener structure. On the frame 30 adjacent the hopper 32 there is located a knife 34 which has an L-shaped standard 36 for supporting a cutter edge 38. The cutter edge 38 is positioned such that the movement of a cartridge 10 therepast will cause a seam 40 of the cartridge formed at the juncture of the flange 20a and the remaining portion of the cover member 16 to intersect the cutter edge 38.

It has been found that slitting the cartridge 10 along seam 40 provides for easy removal of the film spool 22 without creating fragments or splinters which might otherwise tend to damage the film on the spool 22.

A carriage assembly 42 is provided in order to move the cartridges 10 past the knife 34 to accomplish the slitting thereof. The carriage assembly 42 has a sliding nest 44 which is configured to accept a film cartridge 10 with the supply chamber 12 and takeup chamber 14 thereof being positioned on either side of the nest 44. The nest 44 has a relieved portion 46 which permits the takeup chamber 14 to be forced open to facilitate the removal of the spool 22 therefrom. Connected to one end of the nest 44 there is an enlarged end portion 48 while the opposite end of the nest 44 is connected through an appropriate link 50 to a piston rod 52 of a double acting cylinder 54. The cylinder 54 which is supported relative to the opener frame 30 by means of a support bracket 56 moves the sliding carriage 42 from a first position (phantom lines of FIG. 5) where the nest 44 is located under the hopper 32 to receive a film cartridge 10 to a second position (full lines of FIG. 5) past the knife 34 where slitting of the cartridge has been completed and end portion 48 is located under the hopper 32 to prevent removal of an additional cartridge therefrom. Control of the cylinder 54 is described hereinbelow.

In order to accomplish movement of the film spool 22 to a film stripping station after the cartridge has been slit, the spool 22 is captured on a spool support pin 58 when the carriage 42 is moved to its second position. The spool support pin 58 is mounted on a standard or vertical support 60 which rides on a horizontal guide 62 connected to the frame 30. The support pin 58 and vertical support 60 are movable between a first position wherein the film may be readily stripped from the captured spool (see FIG. 3) and a second position wherein movement of the carriage 42 to its second position will bring the bore 24 of the spool 22 into engagement with the pin 58 (see FIG. 2) for capture thereof. At one end of the horizontal guide 62 there is located a support bracket 64 supporting a pneumatic valve 66a which has a valve actuator 68a, the actuator 68a being located so as to be engaged by the vertical support 60 when it is moved to its first position. At the opposite end of the horizontal guide 62 there is located a pneumatic valve 66b which has a valve actuator 68b, the actuator 68b being located so as to be engaged by the vertical support 60 when it is moved to its second position. Movement of the support 60 between its first and second positions is accomplished by means of a double acting cylinder 70 mounted on the frame 30, the cylinder 70 having a piston rod 72 engaging the support 60. The control of the cylinder 70 and the function of the valves 66a and 66b are described hereinbelow.

A kicker assembly 74 is provided to remove the cartridge 10 from the opener 28 after the spool 22 has been removed therefrom. The kicker assembly 74 has a kicker bar 76 which normally overlies the supply chamber 12 when the cartridge 10 is moved to its position where the spool 22 is captured on the spool support pin 58. The kicker bar has a flange engaging edge 78 which is selectively engageable with the flange 20b of the cover member 16 of the cartridge 10. The kicker bar 76 has a pair of trunions 80 extending therefrom which are mounted on a pivot pin 82 for rotation therewith. Connected to the pivot pin 82 is an angle arm 84 which in turn is connected to the vertical support 60 by means of a link 86. Movement of the support 60 by means of the cylinder 70 will thus cause rotation of the kicker bar 76 to cause the edge 78 thereof to engage the flange 20b. Because the supply chamber 12 of the cartridge is supported on an angle plate 88, the kicker bar assembly will cause the cartridge 10 to pivot about its chamber 12 to be discarded.

Discarding of the film spool 22 after the film has been removed therefrom is accomplished by means of a plate 90 which is mounted at one end 92 to the carriage assembly 42 and which has an angled edge surface 94. The plate 90 is located such that when the carriage assembly 42 is in its first position the plate will engage the spool 22 mounted on the support pin 58 when the pin 58 is in its first position for film stripping. As the support pin 58 is moved from its first position to its second position, the angled edge 94 of the plate 90 will cause the spool 22 to be laterally moved off of the pin 58 to be discarded (see FIG. 3), the pin 58 being cleared for reception of the next film spool to be captured.

With the structure of the frangible film cartridge opener 28 thus described the operation thereof is as follows, with particular reference to FIGS. 3, 5, 6 and 7. Initially the rod 72 of the cylinder 70 is fully extended so that the vertical support 60 engages the valve actuator 68a of the valve 66a. Thus, the valve 66a and 66b will be initially positioned to establish a specific pneumatic flow path (see FIG. 7) to maintain the carriage assembly 42 and the vertical support 60 in their respective first positions. A main supply valve 96 controls the admission of pneumatic pressure to the conduits 98 and 100 communicating respectively with the valves 66a and 66b. The valve 96 is a two-position valve having a first flow passage 102 and a second flow passage 104. When the valve 96 is in its initial position, the passage 102 will communicate between the pneumatic pressure supply and the conduit 98 to supply pressure to the valve 66a. The valve 66a, which is positioned by virtue of the vertical support 60 engaging the actuator 68a, has a passage 106 which provides flow communication between the conduit 98 and a flow line 108 which in turn communicates with the cylinder 54 to extend the rod 52 to move the carriage assembly 42 to place the sliding nest 44 under the hopper 32 to receive a film cartridge 10 (phantom position of FIG. 5). Since FIG. 7 is only diagrammatic venting of cylinder 54 (and 70) has not been shown for simplicity and may be accomplished in any well known manner.

In order to begin the cycle for opening a frangible film cartridge, an operator trips a switch 110 to actuate a solenoid 112. The solenoid 112 will move the valve 96 to a position wherein the passage 104 will provide flow communication between the pneumatic pressure supply and the conduit 100. The conduit 100 which communicates with a passage 114 in the valve 66b will transmit pneumatic pressure to the conduit 116 which in turn communicates with the cylinder 70. Pneumatic pressure in conduit 116 will actuate the cylinder 70 to retract the rod 72 thus moving the vertical support 60 to its second position to be located for capture of the spool 22 of a cartridge 10 (see FIG. 2). As the vertical support 60 begins to move from its first position, it will disengage the valve actuator 68a to allow the valve 66a to move to a second position to establish a flow path necessary later in the operational cycle.

When the vertical support 60 reaches its second position, it will engage the valve actuator 68b to move the valve 66b to a position wherein a flow passage 118 in the body thereof will communicate with the conduit 100 to permit flow communication between the pneumatic pressure source and conduit 120. Conduit 120 communicates with the cylinder 54 so that pressure thereto will retract the piston rod 52 to move the carriage assembly 42 and the cartridge containing nest 44 past the knife 34. As described above, the cutter edge 38 will slit the cartridge 10 along the seam 40 in a clean manner without creating any possibly damaging housing fragments. The carriage assembly 42 will continue to move to its second position where the cartridge 10 is located such that the bore 24 of the spool 22 is captured on the pin 58 (see FIG. 5). When the carriage assembly 42 is moved from its position for receiving a cartridge, the enlarged end 48 will prevent any additional film cartridges from being accidently ejected from the hopper 32.

As the carriage assembly 42 reaches its second position it will trip an electrical switch 122 which will in turn actuate a solenoid 124. The solenoid 124 serves to return the valve 96 to its initial position such that passage 102 will provide for flow communication from the pneumatic pressure source to conduit 98. Since the valve 66a will have moved from its initial position to its second position, a passage 126 thereof will permit flow communication between the line 98 and a conduit 128 communicating with the cylinder 70. Thus, when the valve 96 is returned to its initial position, pneumatic pressure will be supplied to the cylinder 70 so as to return the vertical support 60 to its first position permitting valve 66b to return to its initial position.

Figure 6:
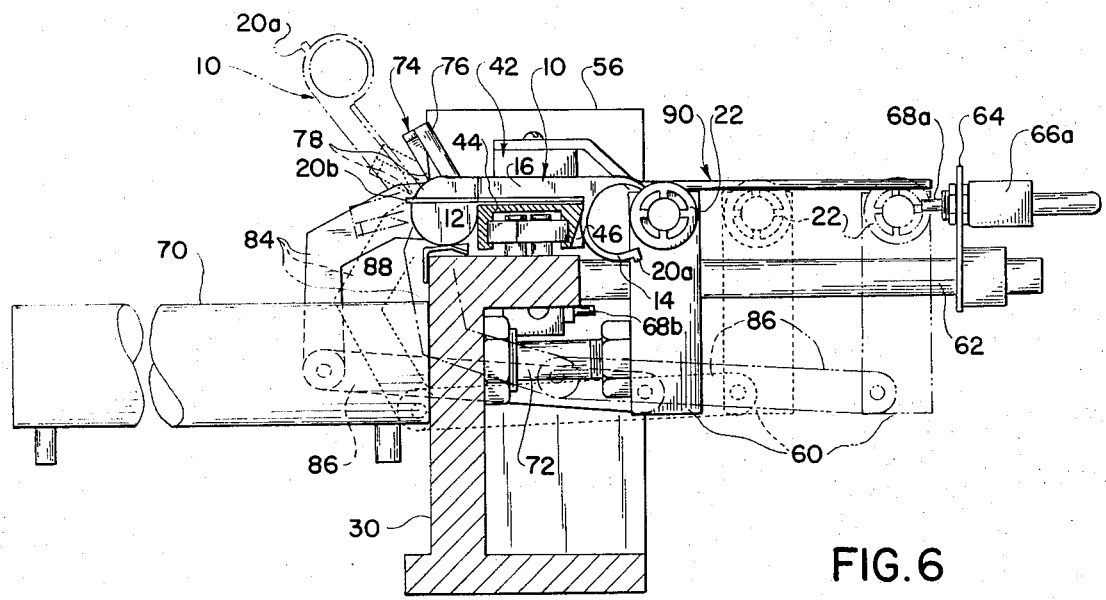
FIG. 6 is a front elevational view similar to that of FIG. 4 showing three stages in the operation of the frangible film cartridge opener.
Figure 7:
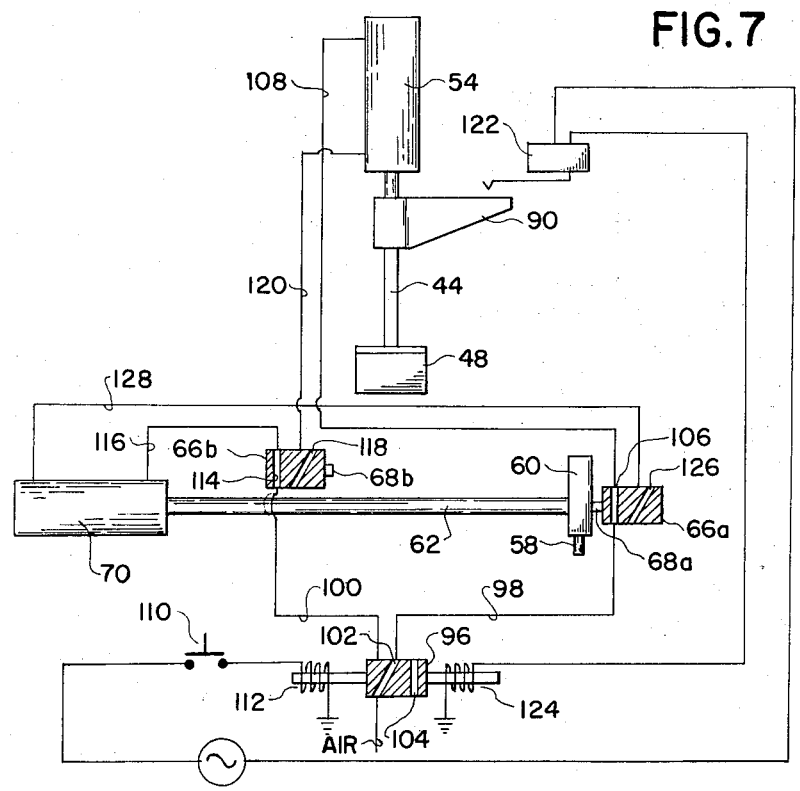
FIG. 7 is a schematic diagram of the circuitry necessary for operation of the frangible film cartridge opener according to invention.

As seen in FIG. 6, movement of the vertical support 60 will cause the pin 58 to move the spool 22 which in turn spreads open the take-up chamber 14 of the cartridge 10 along the split seam 40 so that the spool may be removed from the cartridge 10. As the vertical support 60 continues to move toward its first position, the angle arm 84 will be caused to pivot by action of the link 86 so as to move the kicker assembly 74 counterclockwise about the axis of the supply chamber 12 of the cartridge 10 until the kicker bar 76 engages the flange 20b. The connection between the angle arm 84 and the trunions 80 supporting the kicker bar 76 is selected such that the kicker bar 76 will engage the flange 20b after the spool 22 has cleared the take-up chamber 14 of the cartridge 10. The action of the kicker assembly 74 takes place at such a speed that when the kicker bar 76 engages the flange 20b the forces on the cartridge 10 will cause it to be rapidly pivoted about the axis of the supply chamber 12 flipping over itself to be discarded.

When the vertical support 60 reaches its first position, it will again contact the actuator 68a of the valve 66a to place the passage 106 thereof in communication with conduits 98 and 108. In this manner, pneumatic pressure will be transmitted to the cylinder 54 to return the carriage assembly 42 to its initial position (phantom view of FIG. 5) to receive the next cartridge to be opened. With the vertical support 60 in its first position presenting a film spool on pin 58 to the manual stripping station, the operator may strip the film from the spool 22 at this readily accessible station. When the film has been stripped from the spool 22, the operator may again trip the switch 110 to repeat the cycle of operation. With the initiation of subsequent cycles, the movement of the vertical support 60 will cause the film spool 22 supported on pin 58 to be engaged by the angled edge 94 of the plate 90. (as noted, carriage assembly 42, and thus plate 90, remains in the position shown in FIG. 3 until the vertical support 60 has reached its second position). The angled edge 94 will cause the spool 22 to be moved laterally off the pin 58 so that it will be automatically discarded as the vertical support 60 is moved to its aforementioned second position.

From the foregoing it is readily apparent that there is herein provided a novel apparatus for opening frangible film cartridges and capturing the spool of exposed film housed therein so that the film can be readily removed from the spool. The frangible film cartridge is removed in a specific order from a cartridge hopper and driven past a knife edge to slit the cartridge housing adjacent the film spool as the cartridge is being positioned such that the film spool contained therein is captured on a film spool support post. The area in which the slitting takes place is selected so as to prevent formation of housing fragment splinters which might damage the film contained within the cartridge. The spool support post is then actuated to pull the film spool from the slit cartridge and present the spool to a manual film stripping station while the cartridge housing is discarded. After the film is manually stripped from the spool, the support post is returned to its initial position for receiving a new film spool with the empty spool being automatically discarded.

The invention has been described in detail with particular reference to a preferred embodiment thereof, but it will be understood that variations and modifications can be effected within the spirit and scope of the invention.

We claim:

1. An apparatus for opening a film cartridge of the type having a frangible body including a supply chamber and a take-up chamber connected by an intermediate cover member and a film spool in said take-up chamber accessible through said takeup chamber, said apparatus comprising:
   knife means;
   means for receiving a film cartridge and moving said cartridge past said knife means so as to slit the cartridge along a seam adjacent the take-up chamber without splintering the cartridge;
   film spool support means movable between a film spool capturing position adjacent said knife means for engaging and capturing a film spool within said cartridge and a film stripping position remote from said film spool capturing position; and
   means for moving said film spool support means between said film spool capturing position and said film stripping position whereby when said support means moves from said film spool capturing position to said film stripping position said film spool will spread apart the walls of said take-up chamber at opposite sides of said slit and will be removed from said cartridge through said slit to permit access to the film so that it may be stripped from the spool.

2. The apparatus of claim 1 further including:
   means for discarding said cartridge as the film spool support means is moved from its film spool capturing position to its film stripping position; and
   means for discarding said film spool after said film has been removed therefrom when said spool support means is moved from its film stripping position to its film spool capturing position.

3. The apparatus of claim 2 wherein said means for discarding said cartridge includes:
   a cartridge engaging kicker bar mounted for pivotable movement about said supply chamber into engagement with said cartridge;
   link means connected to said kicker bar for pivoting said kicker bar into engagement with said cartridge when said film spool support means moves from its film spool capturing position to its film stripping position; and
   means for supporting said cartridge when it is in position to have the film spool thereof captured such that engagement of said kicker bar with said cartridge will cause said cartridge to flip over on itself to be discarded.

4. The apparatus of claim 2 wherein said means for discarding said film spool includes:
   an angled surface fixed to said film cartridge receiving and moving means so as to be located adjacent said film spool support means and engage a captured film spool when said cartridge receiving and moving means is in a film cartridge receiving position and said film spool support means is in its film stripping position, said angled surface being oriented at such an angle that movement of said film spool support means toward its film spool capturing position will result in the film spool being laterally moved on said spool support means so as to be removed therefrom.

5. The apparatus of claim 1 wherein said film cartridge receiving and moving means includes a carriage assembly comprising a sliding nest configured to accept a film cartridge in a particular orientation to locate said cartridge relative to said knife means, and reversible drive means for moving said nest from a cartridge receiving position past said knife means to a position wherein said film spool support means can capture said film spool through said take-up chamber of said cartridge.

6. The apparatus of claim 1 wherein said film spool support means includes a film spool support pin engageable with said film spool through said take-up chamber of said cartridge, and a standard for supporting said film spool support pin; and wherein said means for moving said film spool support means includes a reversible drive means connected to said standard.

7. An apparatus for opening a film cartridge of the type having a frangible body including a supply chamber and a take-up chamber connected by an intermediate cover member and a film spool in said take-up chamber accessible through said take-up chamber, said apparatus comprising:
   a frame;
   a hopper for receiving a series of film cartridges of the described type in a specific orientation, said hopper mounted on said frame;
   a carriage assembly mounted on said frame for receiving and moving a cartridge to be opened, said assembly comprising a sliding nest configured to accept a film cartridge in a specific orientation, reversible drive means for moving said sliding nest between a cartridge receiving position and a film spool capturing position, and an end portion connected to said nest configured so as to prevent removal of additional cartridges from said hopper when said nest is not in said cartridge receiving position;

knife means for slitting said cartridge, said knife means comprising a standard mounted on said frame, a cutter edge extending from said standard, said cutter edge being positioned to slit said cartridge along a seam adjacent said take-up chamber without splintering said cartridge as said sliding nest is moved from its cartridge receiving position to its film spool capturing position; and film spool support means comprising a standard, a film spool support pin extending from said standard, and reversible drive means mounted on said frame for moving said standard from a position where said film spool support pin is in position to capture a film spool through said take-up chamber of said cartridge to a position where a captured film spool will be removed from said cartridge through said slit to permit access to the film so that it may be stripped from the spool.

8. The apparatus of claim 7 further including:

means for discarding said cartridge as said film spool support means is moved from its film spool capture position to its film stripping position; and means for discarding said film spool after said film has been removed therefrom when said spool support means is moved from its film stripping position to its film spool capturing position.

* * * * *